United States Patent [19]

Mattley et al.

[11] Patent Number: 4,782,518
[45] Date of Patent: Nov. 1, 1988

[54] APPARATUS FOR CONVERTING DISTINCTIVE RING TO SELECTIVE RING IN TELEPHONE LINES

[75] Inventors: Danny G. Mattley, P.O. Box 174, Hastings, Nebr. 68902; Paul Hunt, Brainerd, Minn.

[73] Assignee: Danny G. Mattley, Hastings, Nebr.

[21] Appl. No.: 133,539

[22] Filed: Dec. 16, 1987

[51] Int. Cl.⁴ ............................................. H04M 3/42
[52] U.S. Cl. ...................................... 379/201; 379/373
[58] Field of Search ............... 379/201, 373, 374, 375, 379/372, 100, 180, 387

[56] References Cited

U.S. PATENT DOCUMENTS 4,675,899 6/1987 Ahuja .................................. 379/180

*Primary Examiner*—James L. Dwyer
*Attorney, Agent, or Firm*—Zarley, McKee, Thomte Voorhees & Sease

[57] ABSTRACT

An apparatus for converting a distinctive ring to a selective ring includes a rectifier connected between a main telephone line and ancillary telephone lines to prevent AC ring current from passing to the ancillary lines. A relay is connected to each ancillary line with contacts connecting the ancillary line to the rectifier. Each relay has additional contacts to which the ancillary telephone lines may be selectively connected, the additional contacts being connected to the main telephone line, bypassing the rectifier. When a selected relay is energized, ring current bypasses the rectifier and will ring the telephone on that ancillary line. A cadence detecting circuit includes a "quiet" interval measuring circuit and an "active" interval measuring circuit, to measure the first "ring" and the first "quiet" interval between rings. The quiet interval circuit will energize one relay if the quiet interval is less than a predetermined length. The active interval circuit will energize a different relay if the active interval is of a minimum length of time.

8 Claims, 3 Drawing Sheets

APPARATUS FOR CONVERTING DISTINCTIVE RING TO SELECTIVE RING IN TELEPHONE LINES

TECHNICAL FIELD

This invention relates generally to telephone systems having a distinctive ring feature, and more particularly to a novel apparatus for converting the distinctive ring feature to a selective ring.

BACKGROUND OF THE INVENTION

Telephone companies are now beginning to provide distinctive ringing as a feature for its customers. Distinctive ringing is a feature which allows a single telephone line in a home to be assigned more than one telephone number. This is accomplished in the central office of the telephone company, which utilizes computer software to forward a specific ring cadence in response to an assigned telephone number. Thus, if a customer is assigned a "main" telephone number, a "teen line" telephone number and a "private line" telephone number, a different ring cadence is assigned each number. If a caller dials the main telephone number, all of the phones in the customer's home will ring as usual—with a two second "on" and four second "off" cadence. If a caller dials the teen line number, a different cadence is transmitted—for example, eight hundred milliseconds on, four hundred milliseconds off, eight hundred milliseconds on, and four thousand milliseconds off. This would produce two short rings in each set of cadences. If the private line number was dialed, then a short/long/short ring cadence would be transmitted. Thus, a "distinctive" ring is produced for each of the separate telephone numbers assigned to a customer. This allows the customer to know who the call may be intended for prior to answering the telephone. At the same time, the convenience and lower cost of using only a single line is maintained by the customer.

Obviously, such a system can be utilized in business as well, wherein a number of departments may be assigned a different telephone number with their own distinctive ring.

The main problem with the use a distinctive ring system is that every telephone on the line will ring. Thus, while the customer will know to whom the call is generally directed, it will be necessary to listen to the ringing of all of the telephones no matter who the call is directed to. This can become quite annoying.

Another problem is if selective use of a telephone answering device is desired with the phone system. Since conventional telephone answering machines are activated by the ringing of the telephone, some of these machines cannot discriminate between the various distinctive ring cadences which occur on the line. Thus, the machine will answer the phone no matter which cadence is transmitted to the customer. Many times it is desirable that only one of several lines be answered with the telephone answering machine. For example, it may be desired that the main telephone number be answered by the answering machine while the customer desires to personally respond to any telephone calls on a private line. It is not possible to utilize conventional answering machines in this fashion on a distinctive ring telephone system.

It is therefore a general object of the present invention to provide a convertor apparatus for converting a distinctive ring into a selective ring telephone system.

Another object is to provide a convertor apparatus which is connected at the customer's premises to the conventional existing telephone lines to convert the signal into a selective ring feature.

A further object is to provide a convertor apparatus which will ring only selected phones based upon the distinct cadence transmitted over the main telephone line.

Still another object is to provide a convertor apparatus which will ring selected telephones yet permit speech-carrying current to all telephones.

These and other objects will be apparent to those skilled in the art.

SUMMARY OF THE INVENTION

The convertor apparatus of this invention is connected to a main telephone line at the premises of the consumer, where ancillary telephone lines are joined to the main line. A rectifier connected between the main and ancillary telephone lines prevents AC ring current from passing to the ancillary lines. A relay is connected to each ancillary line with contacts connecting the ancillary line to the rectifier. Each relay has additional contacts to which the ancillary telephone lines may be selectively connected, the additional contacts being connected to the main telephone line, bypassing the rectifier. When a selected relay is energized, ring current bypasses the rectifier and will ring the telephone on that ancillary line.

A cadence detecting circuit is also connected to the main telephone line. A "quiet" interval measuring circuit and an "active" interval measuring circuit will measure the first "ring" and the first "quiet" interval between rings. The quiet interval circuit will energize one relay if the quiet interval is less than a predetermined length. The active interval circuit will energize a different relay if the active interval is of a minimum length of time. Thus, a specific ancillary telephone line is connected to ring current based upon the ring cadence detected by the cadence detecting circuit.

The relays and ring cadence detecting circuits are powered from the ring current of the main telephone line.

DESCRIPTION OF THE PREFERRED EMBODIMENT

Figure 1:
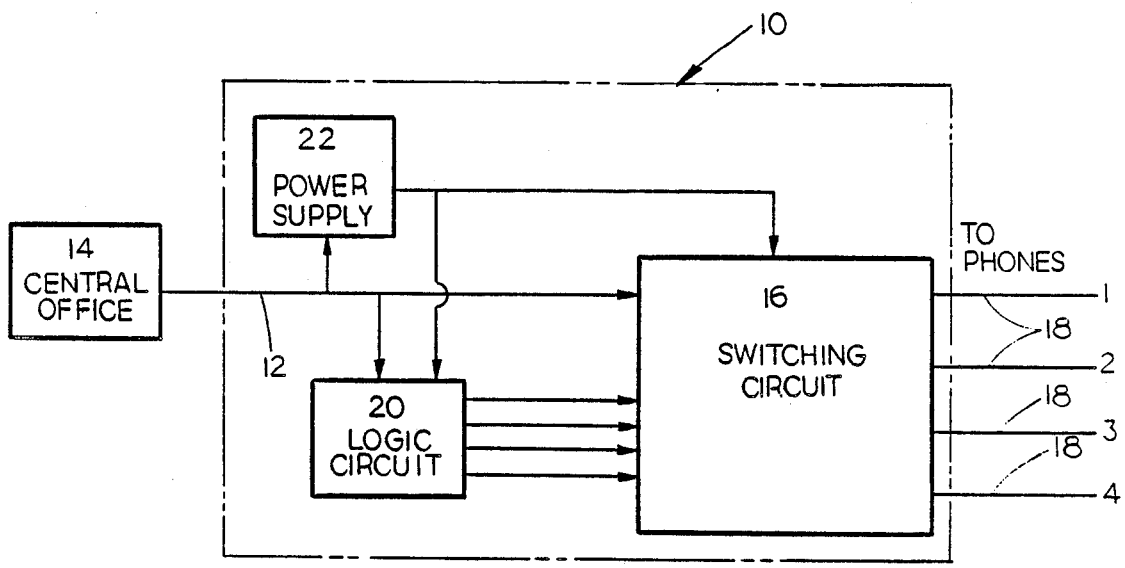
FIG. 1 is a general block diagram of the invention.

Referring now to the drawings, in which similar or corresponding parts are identified by the same reference numeral, the block diagram of FIG. 1 generally shows the invention within a broken line box indicated generally at 10.

A main telephone line 12 from a telephone company's central office 14 is connected to a switching circuit 16, the switching circuit being operable to switch a ring signal to one or more of four individual ancillary telephone lines 18. The switching circuit 16 is operated by a cadence-sensing logic circuit 20 connected to main phone line 12. The cadence sensing circuit 20 and switching circuit 16 are powered by a power supply 22 which takes power directly from the main telephone line 12.

In general, a ring signal is sent from central office 14 down main telephone line 12 to ultimately reach ancillary telephone lines 18. When the distinctive ring system is utilized, the ring signal will have a predetermined ring cadence which is sent in response to the dialing of one of several specific telephone numbers which serve main telephone line 12 and all of ancillary telephone lines 18.

Three conventional ring cadences are: (1) two thousand milliseconds "on" and four thousand milliseconds "off"; (2) eight hundred milliseconds "on", four hundred milliseconds "off"; eight hundred milliseconds "on", four thousand milliseconds "off"; and (3) three hundred milliseconds "on", two hundred milliseconds "off", one thousand milliseconds "on", two hundred milliseconds "off", three hundred milliseconds "on", four thousand milliseconds "off".

These cadences would ring the telephones of the customer as follows: (1) one long ring per ring cadence cycle; (2) two short rings per cadence cycle; and (3) one short, one long and one short ring per ring cadence cycle. Thus, without the applicant's invention, all of the ancillary telephone lines 18 would ring in response to one of the cadences described above.

However, the applicant's switching circuit 16 is inserted to allow passage of the ring cadence to only selected ancillary lines 18. It should be noted that speech-carrying current is not hampered or altered by the invention. Thus, every ancillary telephone line 18 is always capable of use for speaking, even though only a selected number of the telephones will ring in response to a specific ring cadence. There are many workable methods by which the cadence sensing logic circuit 20 may discriminate between various ring cadences; for example, by: (1) measuring the quiet period between rings; (2) measuring the maximum active period of rings; (3) counting the number of quiet to active period transitions in one cycle; (4) measuring the ratio of ring signal "on" time to "off" time; (5) measuring the ratios of the shortest ring signal "on" time to the longest ring signal "on" in one cycle; or (6) any combination of the above methods.

Figure 2:
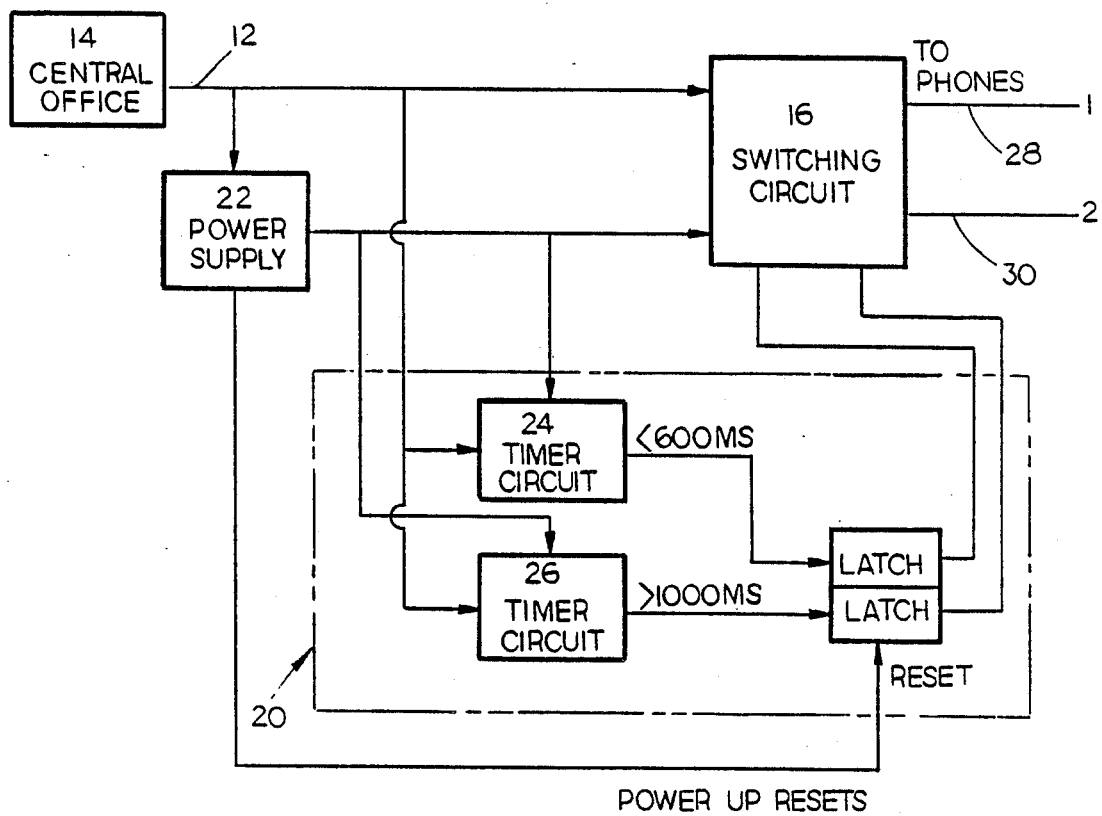
FIG. 2 is a block diagram of the preferred embodiment of the invention.

Referring now to FIG. 2, the preferred embodiment of the invention discloses a cadence sensing logic circuit 20 with a simple two output discriminator utilizing a quiet period timer circuit 24 and an active period timer circuit 26. This embodiment is intended to discriminate between two specific cadences, for use on two ancillary telephone lines 28 and 30 of a customer having a main telephone line 12.

Figure 3:
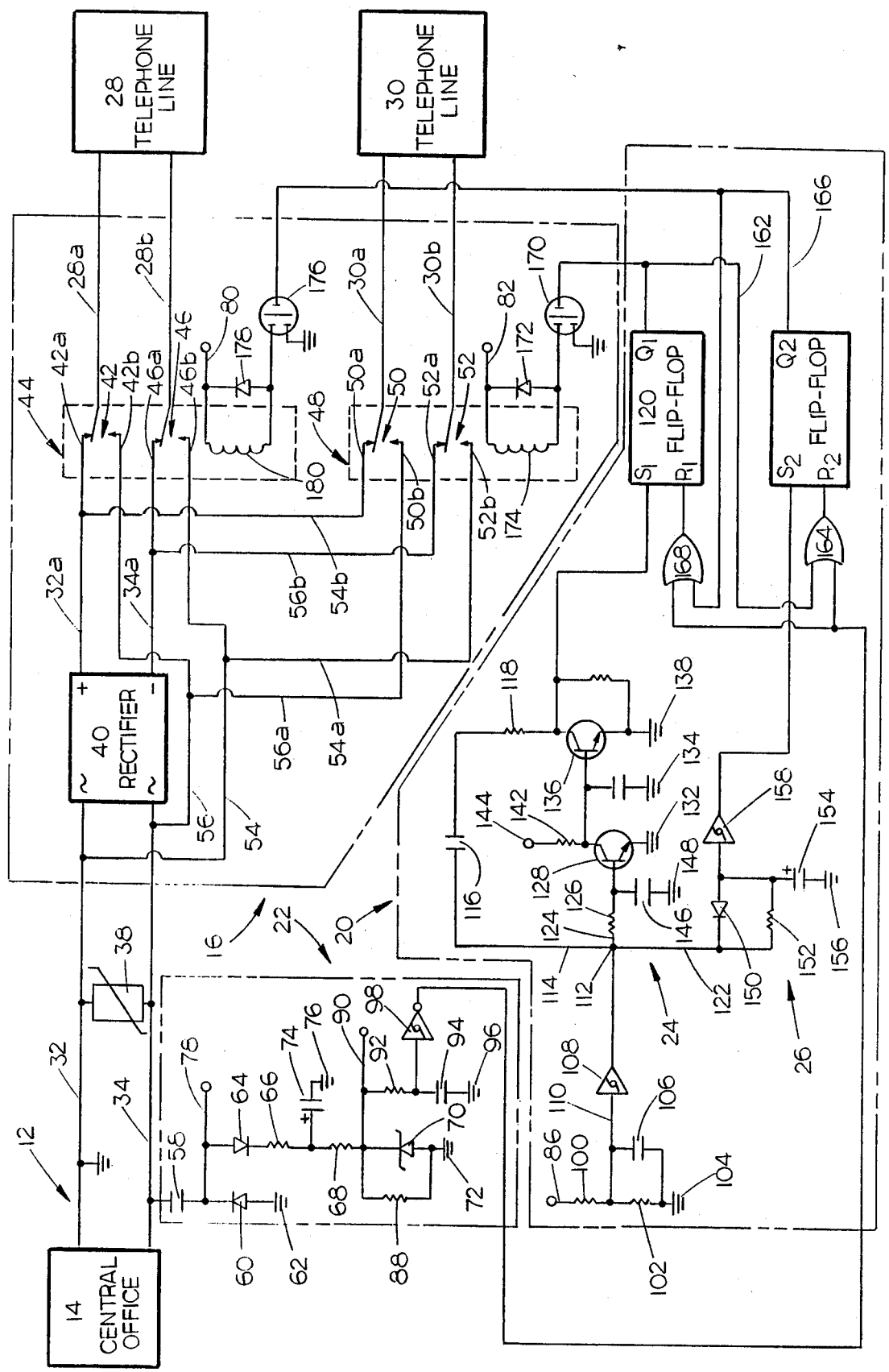
FIG. 3 is a detailed schematic carrying out the embodiment shown in FIG. 2.

FIG. 3 is a detailed schematic of the preferred method for carrying out the invention shown in block diagram of FIG. 2. Telephone line 12 includes a pair of conductors 32 and 34 extending from central office 14, where a ring cadence is determined and sent down the line in response to the dialing of a specific telephone number. Conductor 32 is grounded to common at 36. It should be noted that all ground notations in FIG. 3 refer to a circuit common, and not to an earth ground.

A transient absorber 38 is connected across conductor pair 32 and 34 to protect the components from over-voltage conditions. Conductor pair 32 and 34 are connected to a full wave diode bridge 40 which converts the AC ring voltage to DC voltage. Because the telephones on ancillary telephone lines 28 and 30 require AC voltage in order to ring the bell, rectifier 40 prevents the phones on either ancillary line from ringing.

A conductor 32a connects the positive terminal of rectifier 40 to one contact 42a of a pair of contacts 42 in a first relay 44. Conductor 34a connects the negative terminal of rectifier 40 to one contact 46a of a second pair of contacts. A second relay 48 has a contact 50a and 52a of first and second pairs of contacts 50 and 52, connected to conductors 32a and 34a respectively, via conductors 54a and 54b, respectively.

Ancillary telephone line 28 includes a conductor pair 28a and 28b which are normally in contact with contacts 42a and 46a of relay 44, respectively. Similarly, ancillary telephone line 30 has a pair of conductors 30a and 30b normally in contact with contacts 50a and 52a in relay 48. Thus, in normal condition, DC current flows through contacts 28a and 28b, 30a and 30b such that the telephones on ancillary phone lines 28 and 30 cannot ring. A pair of bypass wires 54 and 56 are connected to conductors 32 and 34 to bypass rectifier 40, and are connected to the remaining contacts 46b and 42b in relay 44, respectively. Thus, when relay 44 is energized, conductors 28a and 28b will be electrically connected to conductors 32 and 34 via bypass wires 54 and 56 and will allow the telephone ancillary line 28 to ring.

A pair of second bypass wires 54a and 56a are connected between bypass wires 54 and 56 and the remaining contacts 50b and 52b, respectively, of relay 48. Thus, when relay 48 is energized, line 30a and 30b will be selectively connected to conductors 32 and 34 via second bypass wires 54a and 56a and bypass wires 54 and 56, and will pass ring current down ancillary telephone line 30. Relays 44 and 48 are designed to return to a ring-preventing position when not energized.

The power supply circuit 22 derives power directly from main telephone line 12. As shown in the drawings, a capacitor 58 couples the ring voltage from conductor 34 with diode 60, where the negative half of the wave form of the ring voltage is clamped by shunting to ground 62. The positive half of the wave form is coupled through diode 64, resistor 66, and resistor 68 to 12-volt zener diode 70 where it is clamped, by shunting to ground 72, and regulated. Capacitor 74 is connected between resistors 66 and 68 and grounded at 76. Capacitor 74 acts as a filter and stores enough energy to maintain the 12 volt ring voltage between the positive wave halves of the ring voltage.

A lead 78 is connected between capacitor 58 and diode 64 and conducts the half wave signal from capacitor 58 to several points in the invention, namely: to lead 80, to power relay 44; to lead 82, to power relay 48; and to lead 86, to power the cadence sensing logic circuit 20. Resistor 66 provides transient over-voltage protection. Resistor 68 allows "working room" for capacitor 74. A resistor 88 is connected in parallel with zener diode 70, and serves as a bleeder resistor.

A lead 90 is connected between resistor 68 and diode 70 and transmits a 12-volt source through a resistor 92 to a capacitor 94, which is grounded at 96. An inverted schmidt trigger 98 is connected between resistor 92 and capacitor 94 and triggers a signal in response to a 200 millisecond time constant from resistor 92 and capacitor 94, the signal being utilized to power the reset of a pair of flip flops in cadence sensing logic circuit 20 (to be described in more detail hereinbelow).

The cadence sensing logic circuit 20 of the present invention includes circuitry for measuring the "quiet" time between the first two rings, designated generally at 24, and a circuit for measuring the "active" time of the first ring, designated generally at 26.

As described above, the half wave signal from capacitor 58 is fed to the ring detect circuit through lead 78 and lead 86. Lead 86 is coupled through resistors 100 and 102 to ground 104. A capacitor 106 is coupled in parallel with resistor 102 such that an approximate 100 millisecond time constant is provided. Schmidt trigger 108 is connected via lead 110 between capacitor 106 and resistors 100 and 102. Thus, schmidt trigger 108 will provide a 100 millisecond ring detect signal. The ring detect signal is transmitted to a junction point 112 where one lead transmits the signal through capacitor 116 and resistor 118 to the "set" terminal $S_1$ of a flip flop 120. A second lead 122 transmits the signal from junction 112 to active time detect circuit 26. And a third lead 24 couples the signal through a resistor 126 to a small signal transistor 128 which inverts the signal and discharges a capacitor 130, the capacitor connected to one terminal of transistor 128 as shown in the drawings. The third terminal of transistor 128 is grounded at 132, and the capacitor 130 is grounded at 134.

A second small signal transistor 136 is connected between capacitor 130 and between resistor 118 in flip flop 120. The terminal for the "on" condition of transistor 136 is grounded at 138. A resistor 140 is connected in parallel with terminal 136 as shown in the drawings. A capacitor 130 is coupled through a resistor 142 to a lead 144 which is connected to lead 90 of power supply circuit 22, so as to charge capacitor 130.

Thus, on power up, a ring detect signal is sent through capacitor 116 and resistor 118 to "set" terminal $S_1$ of flip flop 120 and attempts to set flip flop 120. At the same time, the ring signal turns on transistor 128 to discharge capacitor 130 and thereby assures that transistor 136 is off. After the initial ring voltage goes low, during the "quiet" period between rings, transistor 128 goes off and capacitor 130 begins to charge. It takes capacitor 130 approximately 300 milliseconds to build up a charge to turn on transistor 136. Thus, if the quiet interval is less than 300 milliseconds when the ring detect goes high, transistor 136 will stay off and the ring detect signal is transmitted through capacitor 116 and resistor 118 to terminal $S_1$ to attempt to set flip flop 120. However, if the quiet interval is long (longer than 300 milliseconds), capacitor 130 charges and saturates 136 thereby turning it on and shunting the signal to ground 138.

An additional capacitor 146 is connected between resistor 124 and transistor 128 and is grounded at 148, and serves to delay actuation of transistor 128 by about 10 milliseconds. This assures that transistor 136 is still on all the time that the signal pulse is going through capacitor 116.

As previously discussed, a 200 millisecond time constant signal is produced by schmidt trigger 98 upon power up, and is sent to the "reset" $R_1$ of flip flop 120. Thus, it can be seen that the ring detect signal will attempt to set flip flop 120 upon initial power up but will be prevented from doing so by the signal from schmidt trigger 98 sent to reset $R_1$.

The ring detect signal is also transmitted via lead 122 to diode 150 and resistor 152, which are both connected to capacitor 154 (grounded at 156) as shown in the drawings. While the ring detect signal is low, capacitor 154 is discharge through diode 150. When the ring detect is high, capacitor 154 is charged through resistor 152. A schmidt trigger 158 is coupled between diode 150 and capacitor 154, such that when capacitor 154 reaches the threshold of schmidt trigger 158, the trigger goes high and sends a signal to set terminal $S_2$ of a flip flop 160. The threshold of schmidt trigger 158 will recognize a long ring, in a range between 1,000 to 1,500 milliseconds, thereby ignoring anything shorter—capacitor 154 being discharged without actuation of schmidt trigger 154 if a lesser active time occurs.

As discussed above, schmidt trigger 98 of power supply circuit 22 supplies a 200 millisecond time constant signal to reset terminals $R_1$ and $R_2$ of flip flops 120 and 160. This prevents flip flop 120 from setting upon initiation of the first ring. However, since schmidt trigger 158 has a higher threshold, to go high upon a long ring, the initial 200 millisecond signal will have dissipated long before the "long active" signal is transmitted from schmidt trigger 158 to S2 to set flip flop 150.

To prevent a false setting, flip flops 120 and 160 are cross-coupled, such that only one flip flop may be actuated at a time. Thus, lead 162 is connected between the output $Q_1$ of flip flop 120 through an "OR" gate 164, to reset $R_2$ of flip flop 160. Lead 166 is connected between output $Q_2$ of flip flop 160, through an "OR" gate 168, to reset $R_1$ of flip flop 120. The power supply schmidt trigger 98 is connected to the other input of each "OR" gate 164 and 168, such that the signal from the power supply 22 may also activate the resets $R_1$ and $R_2$ of flip flops 120 and 160, as discussed above.

Output $Q_1$ of flip flop 120 is coupled through a transistor 170 (400-volt VMOS FET transistor) to relay 48. Relay 48 includes a diode 172 and winding 174 in parallel, which serve to energize relay 48 and connect telephone line conductors 30a and 30b with contacts 50b and 52b. Relay 48 is also connected to lead 78 of power supply 22 by virtue of lead 82. Diode 172 acts as a transient absorber to protect transistor 170 from over-voltages.

Similarly, output $Q_2$ of flip flop 160 is coupled through a transistor 176 to relay 44. Relay 44 includes a diode 178 and a winding 180 in parallel, which serve to energize relay 44 and connect telephone line conductor 28a and 28b with contacts 42b and 46b. Relay 44 is also connected to power supply lead 78 via lead 80. Diode 178 also serves as a transient absorber.

In operation, a caller will dial one of at least two available telephone numbers for the specific customer. The ring signal will be identified at the central office 14 and a ring signal of a predetermined ring cadence will be transmitted via phone line 12 to the customer's location. The ring cadence will be measured by the quiet period timer circuit 24 and the active period timer circuit 26. If the cadence is initiated by one long ring (such as the first typical cadence described above), flip flop 160 would be set by schmidt trigger 158 of the active period timer circuit 26, relay 44 would be thrown, and the ring cadence would bypass rectifier 40 and ring the telephone on telephone line 28.

If the ring cadence begins with a short ring, neither flip flop 120 or 160 will be set by the initial ring. Once the second ring of the cadence begins, the quiet period between the rings is recognized as being short by the quiet period timer circuit 24, and flip flop 120 is set, to thereby throw relay 48 and transmit the ring cadence via bypass wires 54, 56 and 54a and 56a to the ring the telephone on telephone line 30.

The preferred values of the above-described components—with the understanding that many different specific methods may be utilized in accomplishing the same task—are as follows:

| Diodes | |
|---|---|
| Ref # | amperes |
| 60 | 1 amp |
| 64 | 1 amp |
| 70 | 12 volt, zener |
| 150 | small signal diode |

| Capacitors | | | |
|---|---|---|---|
| Ref # | mfd | Ref # | mfd |
| 58 | 1 mfd | 116 | .01 mfd |
| 74 | 10 mfd | 130 | 3.3 mfd |
| 94 | .1 mfd | 146 | .1 mfd |
| 106 | .1 mfd | 154 | 3.3 mfd |

| Resistors | | | | | |
|---|---|---|---|---|---|
| Ref # | ohms | Ref # | ohms | Ref # | ohms |
| 66 | 1K | 100 | 4.7 M | 140 | 1 M |
| 68 | 180K | 102 | 560K | 142 | 1 M |
| 88 | 1 M | 118 | 10K | 152 | 330K |
| 92 | 2.2 M | 126 | 1 M | | |

Figure 4:
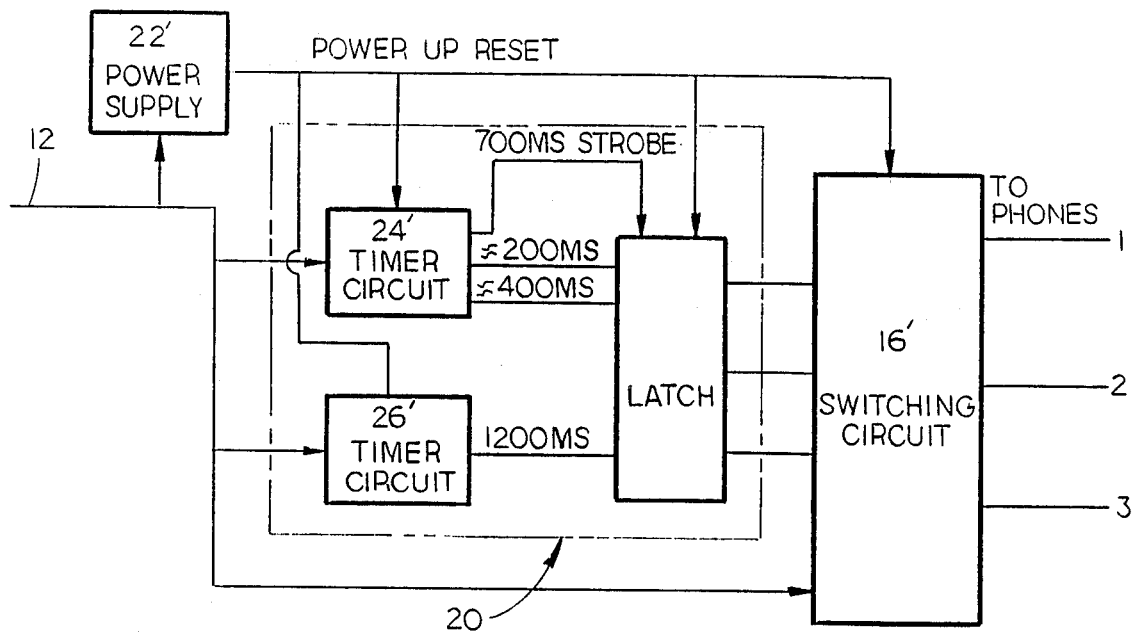
FIG. 4 is a block diagram of a second embodiment of the invention.

Referring now to FIG. 4, a block diagram is shown of another embodiment of the invention. In this embodiment, the cadence sensing logic circuit 20' includes a quiet period timer circuit 24' and an active period timer circuit 26', but the quiet period timer circuit 24' is modified to recognize more than one length of quiet time. With reference to the cadences described above, the quiet period timer circuit 24' includes logic for detecting a quiet period time of about 200 milliseconds and for separately detecting a quiet period time of about 400 milliseconds. A 700 millisecond strobe will "recognize" the end of a cadence, so that the latch must select a switch to operate at that time. Thus, at least three distinct cadences may be detected and selectively transmitted to the individual telephone lines.

Figure 5:
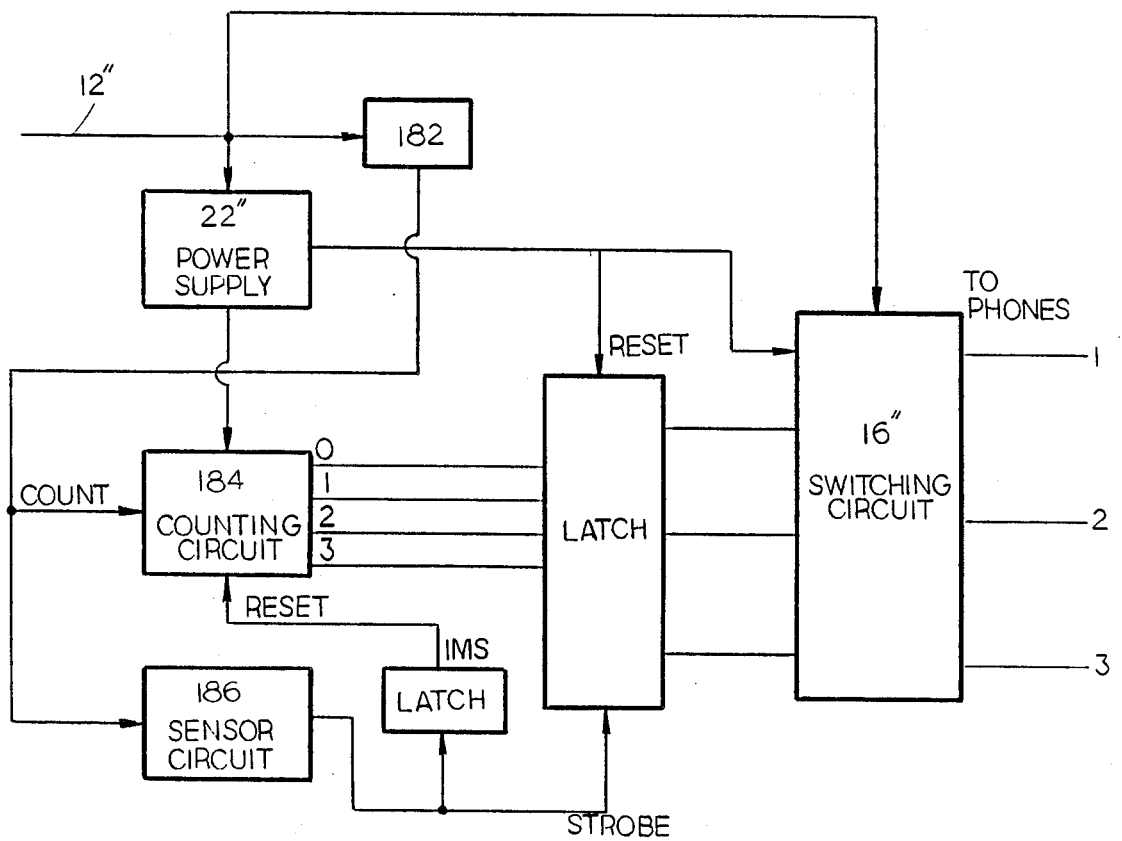
FIG. 5 is a block diagram of a third embodiment of the invention.

Referring to FIG. 5, yet another embodiment is disclosed which counts the number of rings in a full cadence cycle to select the appropriate telephone to which the ring will be transmitted. In this embodiment, main telephone line 12" is connected to a power supply circuit 22", a 100 millisecond ring circuit 182 and to switching circuit 16". The ring sensor 182 is coupled to a counting circuit 184 and a 1,000 millisecond quiet sensor circuit 186 for the three cadences described above. Counting circuit 184 will detect up to three rings in a cadence cycle, and transmit a signal to switch the ring current to a specific telephone line. Quiet sensor 186 is coupled through a one millisecond delay circuit 188 to the counting circuit reset, so that the counting circuit will recognize the end of a cadence cycle.

It can therefore be seen that the invention described above fulfills at least all of the above stated objectives.

We claim:
1. An apparatus for converting distinctive rings in a telephone line provided as a special service by the central office to a selective ring, a main telephone line connected to said apparatus supplying conventional speech carrying current and an AC ring current, the distinctive rings being a plurality of specific ring cadences transmitted along said main telephone line in response to a specific telephone number, said main telephone line being selectively connected to at least two ancillary telephone lines at a customer's premises, comprising:

means for selectively switching only ring current from said main telephone line to at least one said ancillary telephone line in response to a specific ring cadence, and means for powering said selective switching means.

2. The apparatus of claim 1 wherein said switching means includes a rectifier imposed between said main line and ancillary lines, whereby the rectifier prevents AC ring current from reaching said ancillary lines, and wherein said switching means further includes means, connected between said main telephone line and said ancillary telephone lines, for selectively bypassing said rectifier.

3. The apparatus of claim 2, wherein said selective bypass means includes electrical relays, one relay operably connected to each ancillary telephone line, each relay having a normally "off" position and a selectively energized "on" position, said normal "off" position electrically connecting the ancillaiy telephone line to said main telephone line via said rectifier to prevent AC ring current from passing to said ancillary telephone line, and said selective "on" position connecting said ancillary telephone line to said main telephone line to permit the passage of AC ring current, said relays being selectively energized to their "on" positions in response to said plurality of specific ring cadences.

4. The apparatus of claim 1 wherein said means for powering said selective switching means includes an electrical circuit electrically connected to said main telephone line and deriving power from said ring current.

5. The apparatus of claim 1, further comprising means for detecing said plurality of specific ring cadences and transmitting a response to operate said switching means, each transmitted response being different for each specific ring cadence.

6. The apparatus of claim 5 wherein said detection means includes a quiet period timer means for measuring the quiet interval between the first and second rings in a ring cadence.

7. The apparatus of claim 5, wherein said detection means includes an active period timer means for measuring the active length of the first ring in a ring cadence.

8. The apparatus of claim 5, wherein said detection means includes a quiet period timer means for measuring the quiet interval between the first and second rings in a ring cadence, and further includes an active period timer means for measuring the active interval of the first ring in a ring cadence.

* * * * *